(12) United States Patent
Lie

(10) Patent No.: US 6,381,622 B1
(45) Date of Patent: Apr. 30, 2002

(54) SYSTEM AND METHOD OF EXPEDITING BIT SCAN INSTRUCTIONS

(75) Inventor: Milton Lie, McKinney, TX (US)

(73) Assignee: VIA-Cyrix, Inc., Plano, TX (US)

(*) Notice: Subject to any disclaimer, the term of this patent is extended or adjusted under 35 U.S.C. 154(b) by 1367 days.

(21) Appl. No.: 08/748,123

(22) Filed: Nov. 13, 1996

Related U.S. Application Data (63) Continuation of application No. 08/367,033, filed on Dec. 29, 1994, now abandoned.

(51) Int. Cl.[7] ............................................. G06F 7/38
(52) U.S. Cl. ................................................... 708/211
(58) Field of Search ................ 364/715.1, 736.5; 326/106; 708/211, 205, 525

(56) References Cited

U.S. PATENT DOCUMENTS

| | | | | |
|---|---|---|---|---|
| 4,247,891 A | * | 1/1981 | Flynn et al. | 364/715.1 |
| 4,773,033 A | * | 9/1988 | Ikumi | 364/715.1 |
| 4,833,348 A | * | 5/1989 | Hannai | 326/106 |
| 5,091,874 A | * | 2/1992 | Watanabe et al. | 364/715.1 |
| 5,265,258 A | * | 11/1993 | Fiene et al. | 364/715.1 |
| 5,321,640 A | * | 6/1994 | Anderson et al. | 364/715.1 |
| 5,450,560 A | * | 9/1995 | Bridges et al. | 364/715.1 |

* cited by examiner

Primary Examiner—David H. Malzahn
(74) Attorney, Agent, or Firm—Carr & Ferrell LLP (57) ABSTRACT

A system and method of expediting bit scan instructions in a microprocessor is disclosed which employs an execution unit having zero detectors organized along predetermined boundaries for detecting in parallel, the number of leading or trailing zeros in a source operand and for writing a destination index to indicate the first non-zero bit position.

18 Claims, 8 Drawing Sheets

SYSTEM AND METHOD OF EXPEDITING BIT SCAN INSTRUCTIONS

The present application is a file wrapper continuation of application Ser. No. 08/367,033, filed Dec. 29, 1994, now abandoned.

BACKGROUND OF THE INVENTION

1. Field of the Invention:

The invention relates generally to computer systems, and more particularly to a processor employing hardware for expediting bit scan instructions.

2. Description of Related Art

Without limiting the scope of the invention, this background information is provided in the context of a specific problem to which the invention has application.

In the x86 microprocessor architecture, there exists a Bit Scan Forward (BSF) and a Bit Scan Reverse (BSR) instruction. The BSF instruction, which has a syntax of BSF (destination register, source operand), scans the source operand starting with the least significant bit (bit 0) and continues towards the most significant bit to identify the first non-zero bit position. If all bits in the source operand are zero, a zero (ZF) flag is set and an undefined value resides in the destination register. Otherwise, the ZF flag is cleared and the destination register is loaded with an index which reflects the first bit position holding a logical one.

Likewise, the BSR instruction scans the source operand starting with the most significant bit (bit 31 for a double-word and bit 15 for a word) and continues towards the least significant bit (bit 0) to identify the first non-zero bit position. Similarly, the zero (ZF) flag is set if all bits in the source operand are zero. Otherwise, the ZF flag is cleared and the destination resister is loaded with an index which reflects the first bit position holding a logical one. An exemplary, but not exclusive, application for the BSF and BSR instructions is for parsing data tables.

Heretofore, the BSF and BSR instructions have employed a technique which first tests the source operand for all zeros and sets the ZF flag accordingly. If the source operand is not all zeros, then the leftmost or rightmost bit of the source operand (depending if it is a BSF or BSR instruction) is tested for a logical one and if no match is found, it is serially shifted (either left or right), and a destination counter is recursively incremented until a logical one is encountered.

Figure 7A:
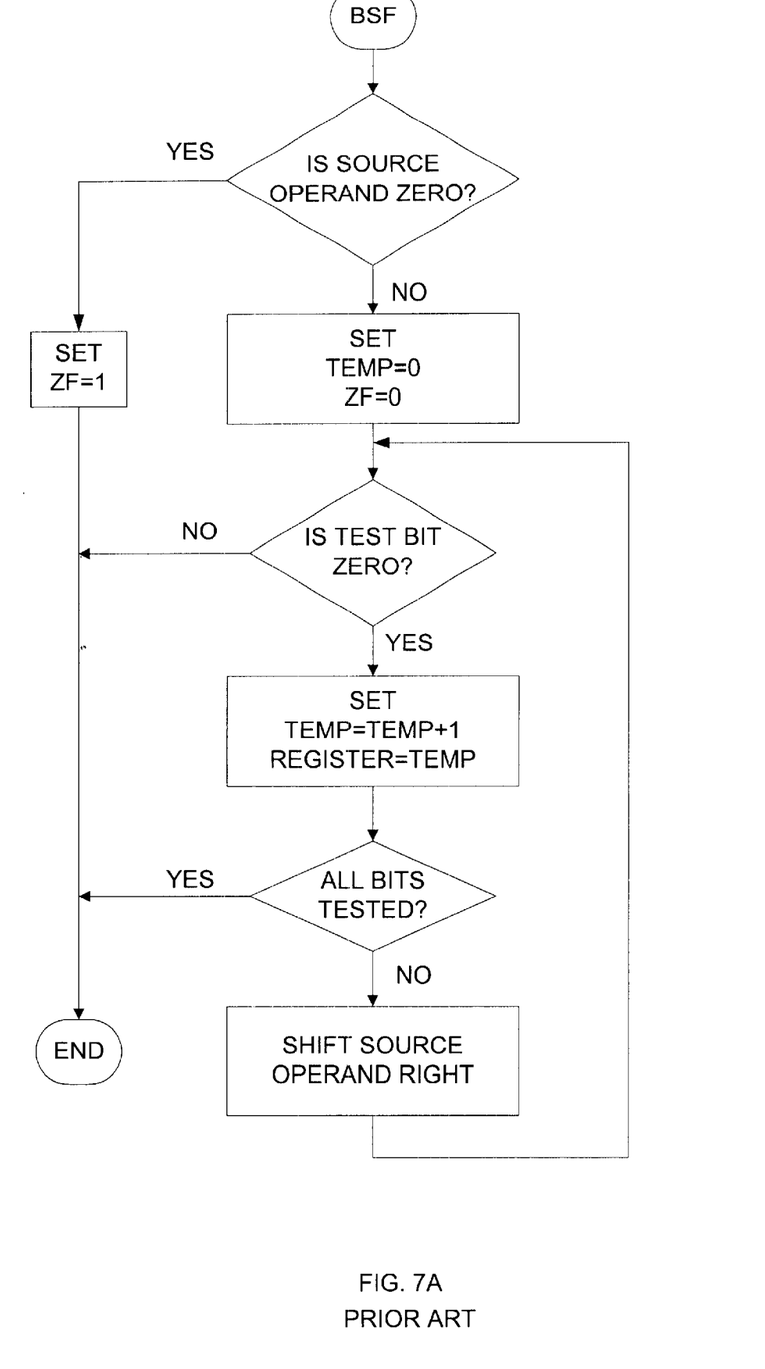
Figure 7B:
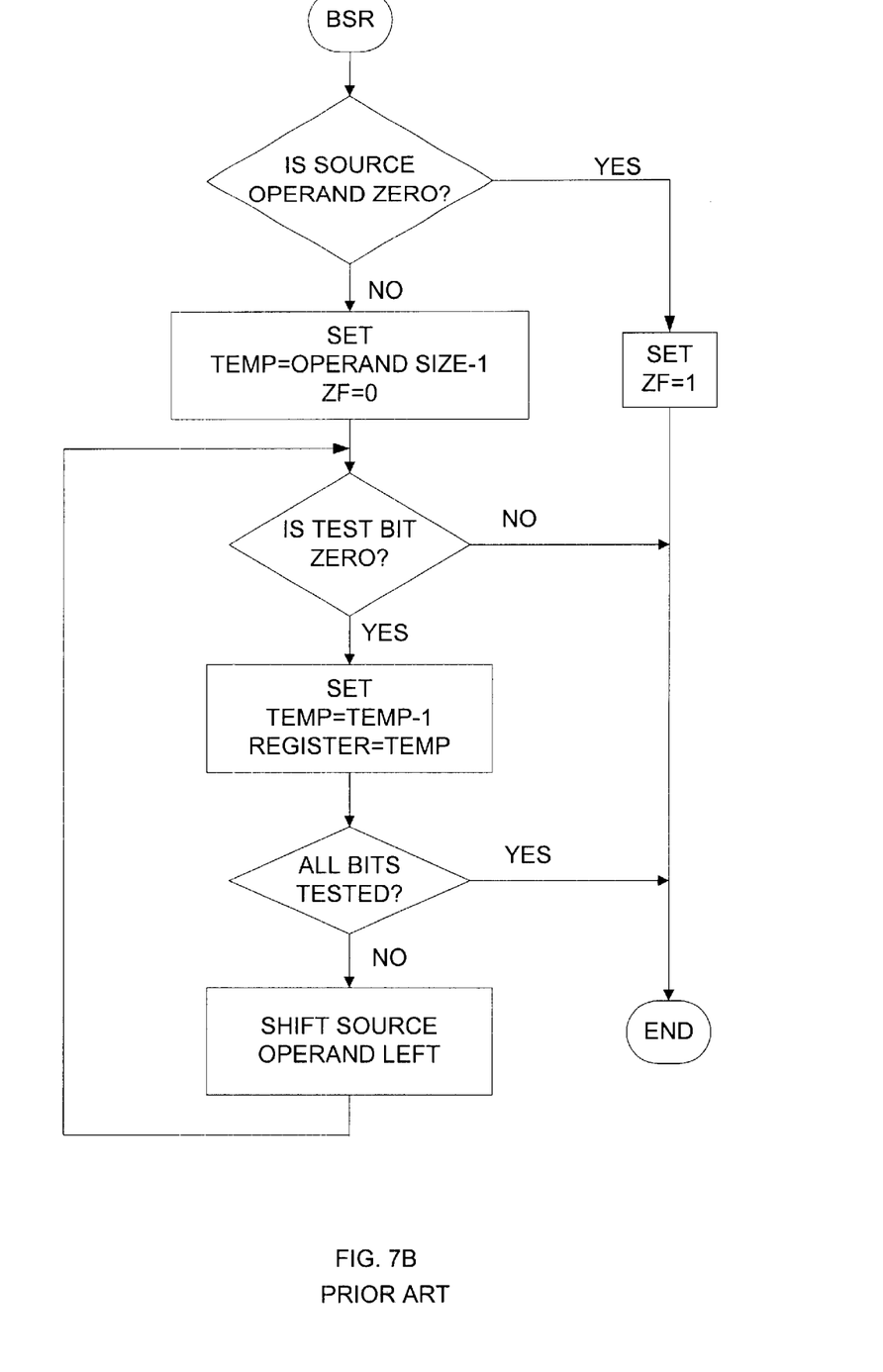

These operations are better understood with reference to the flow diagrams in FIG. 7 and the following snippets of pseudo code in Table 1, which describe the prior art BSF and BSR instructions. Each recursive iteration in the "WHILE" loops take at least one clock cycle. Thus, it can be seen that a bit scan instruction for a double word can take in excess of thirty-two clock cycles. Moreover, the number of clock cycles to complete a BSF or BSR instruction varies radically (typically between 6–72 clock cycles) depending on the number of trailing or leading zeros, making timing unpredictable. This of course, impacts the performance of programs making extensive use of the BSF and BSR instructions.

TABLE 1

| BSF | BSR |
|---|---|
| IF source = 0 | IF source = 0 |
| THEN | THEN |
|    ZF ← 1; |    ZF ← 1; |
|    destination ← UNDEFINED; |    destination ← UNDEFINED; |
| ELSE | ELSE |

TABLE 1-continued

| BSF | BSR |
|---|---|
| temp ← 0; | temp ← Operand-Size - 1; |
| ZF ← 0; | ZF ← 0; |
| WHILE BIT[source, temp] = 0 | WHILE BIT[source, temp] = 0 |
| DO | DO |
|    temp ← temp + 1 |    temp ← temp + 1 |
|    destination ← temp |    destination ← temp |
| END | END |

From the foregoing, it can be seen that there is a need to reduce and standardize the number of clock counts for the BSF and BSR operations regardless of the position of the leading and trailing zeros in the source operand.

SUMMARY OF THE INVENTION

To overcome the limitations in the prior art described above, and to overcome other limitations that will become apparent upon reading and understanding the present specification, the present invention discloses a processor employing an execution unit having leading/trailing zero detectors organized along predetermined boundaries for detecting the first non-zero bit position in a source operand to expedite bit scan forward and reverse instructions. In one clock cycle, all bits in the source operand are concurrently tested to identify the first non-zero bit and its position is written into a destination index register.

A feature of the present invention is the completion of a bit scan on a source operand in a fixed number of clock cycles regardless of the number of leading or trailing zeros.

Another feature of the present invention is symmetrical execution time for either the BSF or BSR instruction.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of systems and methods in accordance with the present invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

The detailed description of an exemplary embodiment of the microprocessor of the present invention is organized as follows:

1. Exemplary Processor System
    1.1. Microprocessor.
    1.2. System
2. Generalized Pipeline Architecture
3. Execution Unit With Leading/Trailing Zero Detector
    3.1 Byte-Wide Detector
    3.2 Combinational Logic
4. Conclusion This organizational table, and the corresponding headings used in this detailed description, are provided for the convenience of reference only. Detailed description of conventional or known aspects of the microprocessor are omitted as to not obscure the description of the invention with unnecessary detail

1. Exemplary Processor System

Figure 1A:
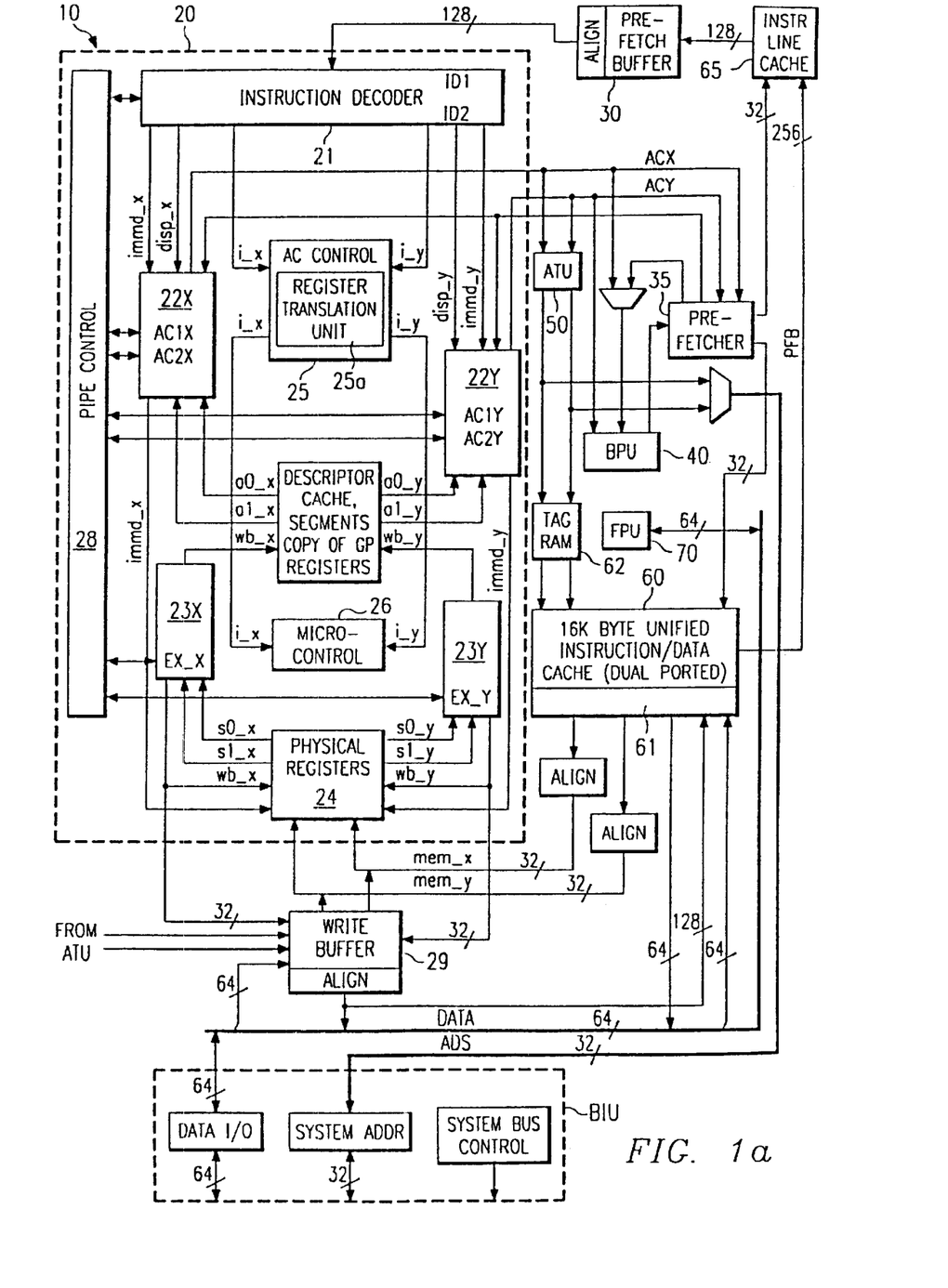
FIG. 1*a* illustrates a block diagram of an overall microprocessor practiced in accordance with the principles of the present invention.
Figure 1B:
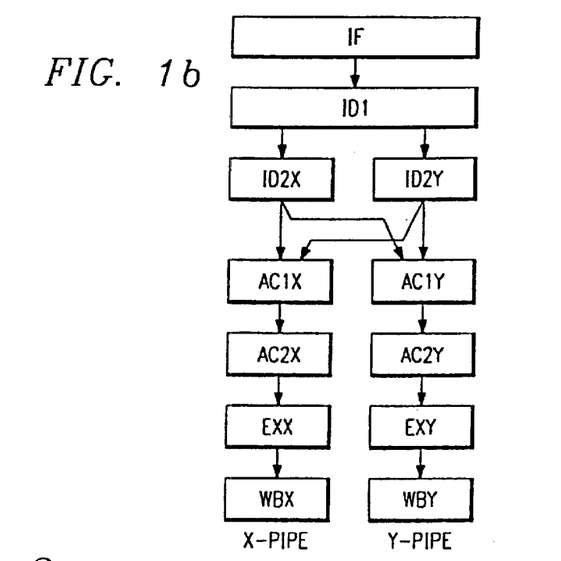
FIG. 1*b* illustrates a generalized block diagram of the instruction pipeline stages for the microprocessor in FIG. 1*a*.
Figure 2:
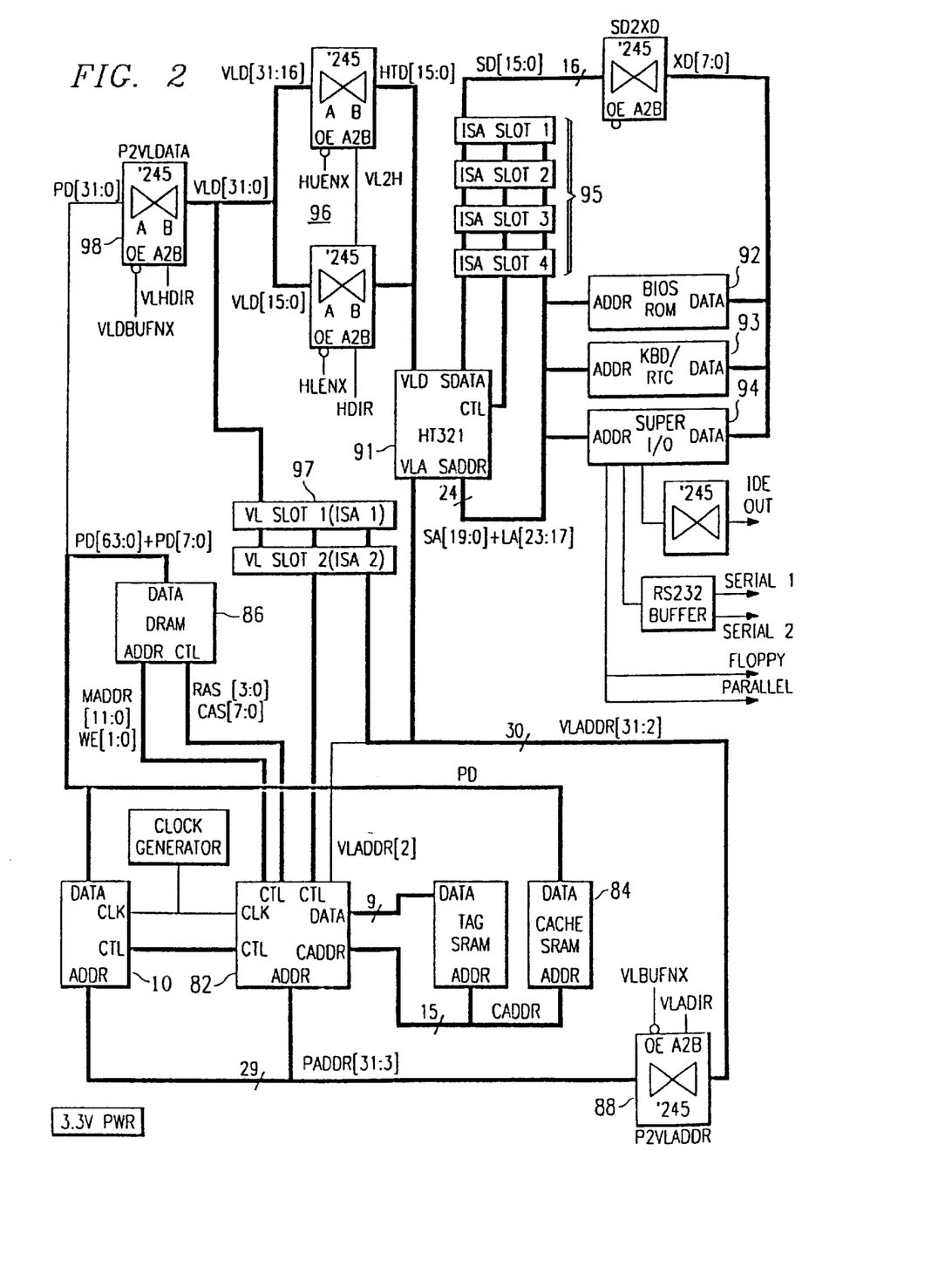
FIG. 2 illustrates a block diagram of a processor system using the microprocessor depicted in FIG. 1*a*.

The exemplary processor system is shown in FIGS. 1a, 1b, and FIG. 2. FIGS. 1a and 1b respectively illustrate the basic functional blocks of the exemplary superscalar, super-pipelined microprocessor along with the pipe stages of the two execution pipelines. FIG. 2 illustrates an exemplary processor system (motherboard) design using the microprocessor.

1.1. Microprocessor

Referring to FIG. 1a, the major sub-blocks of a microprocessor 10 include: (a) central processing unit (CPU) core 20, (b) prefetch buffer 30, (c) prefetcher 35, (d) branch processing unit (BPU) 40, (e) address translation unit (ATU) 50, and (f) unified 16 Kbyte code/data cache 60, including TAG RAM 62. A 256 byte instruction line cache 65 provides a primary instruction cache to reduce instruction fetches to the unified cache, which operates as a secondary instruction cache. An onboard floating point unit (FPU) 70 executes floating point instructions issued to it by the CPU core 20.

The microprocessor uses internal 32-bit address and 64-bit data buses ADS and DATA, respectively. A 256 bit (32 byte) prefetch bus (PFB), corresponding to the 32 byte line size of the unified cache 60 and the instruction line cache 65, allows a full line of 32 instruction bytes to be transferred to the instruction line cache in a single clock. Interface to external 32 bit address and 64 bit data buses is through a bus interface unit (BIU).

The CPU core 20 is a superscalar design with two execution pipes X and Y. It includes an instruction decoder 21, address calculation units 22X and 22Y, execution units 23X and 23Y, and a register file 24 with 32 32-bit registers. An AC control unit 25 includes a register translation unit 25a with a register scoreboard and register renaming hardware. A microcontrol unit 26, including a microsequencer and microROM, provides execution control.

Writes from CPU core 20 are queued into twelve 32 bit write buffers 29—write buffer allocation is performed by the AC control unit 25. These write buffers provide an interface for writes to the unified cache 60—non-cacheable writes go directly from the write buffers to external memory. The write buffer logic supports optional read sourcing and write gathering.

A pipe control unit 28 controls instruction flow through the execution pipes, including: keeping the instructions in order until it is determined that an instruction will not cause an exception; squashing bubbles in the instruction stream; and flushing the execution pipes behind branches that are mispredicted and instructions that cause an exception. For each stage, the pipe control unit keeps track of which execution pipe contains the earliest instruction, provides a "stall" output, and receives a "delay" input.

BPU 40 predicts the direction of branches (taken or not taken), and provides target addresses for predicted taken branches and unconditional change of flow instructions jumps, calls, returns). In addition, it monitors speculative execution in the case of branches and floating point instructions, i.e., the execution of instructions speculatively issued after branches which may turn out to be mispredicted, and floating point instructions issued to the FPU which may fault after the speculatively issued instructions have completed execution. If a floating point instruction faults, or if a branch is mispredicted (which will not be known until the EX or WB stage for the branch), then the execution pipeline must be repaired to the point of the faulting or mispredicted instruction (ie., the execution pipeline is flushed behind that instruction), and instruction fetch restarted.

Pipeline repair is accomplished by creating checkpoints of the processor state at each pipe stage as a floating point or predicted branch instruction enters that stage. For these checkpointed instructions, all resources (programmer visible registers, instruction pointer, condition code register) that can be modified by succeeding speculatively issued instructions are checkpointed. If a checkpointed floating point instruction faults or a checkpointed branch is mispredicted, the execution pipeline is flushed behind the checkpointed instruction—for floating point instructions, this will typically mean flushing the entire execution pipeline, while for a mispredicted branch there may be a paired instruction in EX and two instructions in WB that would be allowed to complete.

For the exemplary microprocessor 10, the principle constraints on the degree of speculation are: (a) speculative execution is allowed for only up to four floating point or branch instructions at a time (i.e., the speculation level is maximum 4), and (b) a write or floating point store will not complete to the cache or external memory until the associated branch or floating point instruction has been resolved (i.e., the prediction is correct, or floating point instruction does not fault).

The unified cache 60 is 4-way set associative (with a 4k set size), using a pseudo-LRU replacement algorithm, with write-through and write-back modes. It is dual ported (through banking) to permit two memory accesses (data read, instruction fetch, or data write) per clock. The instruction line cache is a fully associative, lookaside implementation (relative to the unified cache 60), using an LRU replacement algorithm.

The FPU 70 includes a load/store stage with 4-deep load and store queues, a conversion stage (32-bit to 80-bit extended format), and an execution stage. Loads are controlled by the CPU core 20, and cacheable stores are directed through the write buffers 29 (ie., a write buffer is allocated for each floating point store operation).

Referring to FIG. 1b, the microprocessor has seven-stage X and Y execution pipelines: instruction fetch (IF), two instruction decode stages (ID1, ID2), two address calculation stages (AC1, AC2), execution (EX), and write-back (WB). Note that the complex ID and AC pipe stages are superpipelined.

The IF stage provides a continuous code stream into the CPU core 20. The prefetcher 35 fetches 16 bytes of instruction data into the prefetch buffer 30 from either the (primary) instruction line cache 65 or the (secondary) unified cache 60. BPU 40 is accessed with the prefetch address, and supplies target addresses to the prefetcher for predicted changes of flow, allowing the prefetcher to shift to a new code stream in one clock.

The decode stages ID1 and ID2 decode the variable length X86 instruction set The instruction decoder 21 retrieves 16 bytes of instruction data from the prefetch buffer 30 each clock. In ID1, the length of two instructions is decoded (one each for the X and Y execution pipes) to obtain the X and Y instruction pointers—a corresponding X and Y byte-used signal is sent back to the prefetch buffer (which then increments for the next 16 byte transfer). Also in ID1, certain instruction types are determined, such as changes of flow, and immediate and/or displacement operands are separated. The ID2 stage completes decoding the X and Y instructions, generating entry points for the microROM and decoding addressing modes and register fields.

During the ID stages, the optimum pipe for executing an instruction is determined, and the instruction is issued into that pipe. Pipe switching allows instructions to be switched from ID2X to AC1Y, and from ID2Y to AC1X. For the exemplary embodiment certain instructions are issued only into the X pipeline: change of flow instructions, floating point instructions, and exclusive instructions. Exclusive instructions include: any instruction that may fault in the EX pipe stage and certain types of instructions such as protected mode segment loads, string instructions, special register access (control, debug, test), Multiply/Divide, Input/Output, Push All/Pop All (PUSH/POPA), and task switch. Exclusive instructions are able to use the resources of both pipes because they are issued alone from the ID stage (i.e., they are not paired with any other instruction). Except for these issue constraints, any instructions can be paired and issued into either the X or Y pipe.

The address calculation stages AC1 and AC2 calculate addresses for memory references and supply memory operands. The AC1 stage calculates two 32 bit linear (three operand) addresses per clock (four operand addresses, which are relatively infrequent, take two clocks). Data dependencies are also checked and resolved using the register translation unit 25a (register scoreboard and register renaming hardware)—the 32 physical registers 24 are used to map the 8 general purpose programmer visible logical registers defined in the X86 architecture (EAX, EBX, ECX, EDX, EDI, ESI, EBP, ESP).

The AC unit includes eight architectural (logical) registers (representing the x86 defined register set) that are used by the AC unit to avoid the delay required to access in AC1 the register translation unit before accessing register operands for address calculation. For instructions that require address calculations, AC1 waits until the required data in the architectural registers is valid (no read after write dependencies) before accessing those registers. During the AC2 stage, the register file 24 and the unified cache 60 are accessed with the physical address (for cache hits, cache access time for the dual ported unified cache is the same as that of a register, effectively extending the register set)—the physical address is either the linear address, or if address translation is enabled, a translated address generated by the ATU 50.

Translated addresses are generated by the ATU 50 from the linear address using information from page tables in memory and workspace control registers on chip. The unified cache is virtually indexed and physically tagged to permit, when address translation is enabled, set selection with the untranslated address (available at the end of AC1) and, for each set, tag comparison with the translated address from the ATU 50 (available early in AC2). Checks for any segmentation and/or address translation violations are also performed in AC2.

Instructions are kept in program order until it is determined that they will not cause an exception. For most instructions, this determination is made during or before AC2—floating point instructions and certain exclusive instructions may cause exceptions during execution. Instructions are passed in order from AC2 to EX (or in the case of floating point instructions, to the FPU)—because integer instructions that may still cause an exception in EX are designated exclusive, and therefore are issued alone into both execution pipes, handling exceptions in order is ensured.

The execution stages EXX and EXY perform the operations defined by the instruction. Instructions spend a variable number of clocks in EX, i.e., they are allowed to execute out of order (out of order completion). Both EX stages include adder, logical, and shifter functional units, and in addition, the EX_X stage 23X contains multiply/divide hardware. Moreover, the EX_X stage 23X contains the leading/trailing zero detector 200 of the present invention for executing the BSF and BSR instructions in a fixed number of clock cycles.

The WB stage updates the register file 24, condition codes, and other parts of the machine state with the results of the previously executed instruction. The register file is written in Phase 1 (PH1) of WB and read in Phase 2 (PH2) of AC2.

1.2. System

Referring to FIG. 2, for the exemplary embodiment, microprocessor 10 is used in a processor system that includes a single chip memory and bus controller 82. The memory/bus controller 82 provides the interface between the microprocessor and the external memory subsystem—level two cache 84 and main memory 86—controlling data movement over the 64 bit processor data bus PD (the data path is external to the controller which reduces its pin count and cost).

Controller 82 interfaces directly to the 32-bit address bus PADDR, and includes a one bit wide data port (not shown) for reading and writing registers within the controller. A bi-directional isolation buffer 88 provides an address interface between microprocessor 10 and VL and ISA buses.

Controller 82 provides control for the VL and ISA bus interface. A VL/ISA interface chip 91 (such as an HT321) provides standard interfaces to a 32 bit VL bus and a 16 bit ISA bus. The ISA bus interfaces to BIOS 92, keyboard controller 93, and I/O chip 94, as well as standard ISA slots 95. The interface chip 91 interfaces to the 32 bit VL bus through a bi-directional 32/16 multiplexer 96 formed by dual high/low word [31:16]/[15:0] isolation buffers. The VL bus interfaces to standard VL slots 97, and through a bi-directional isolation buffer 98 to the low double word [31:0] of the 64 bit processor data (PD) bus.

2. Generalized Pipeline Architecture

Figure 3:
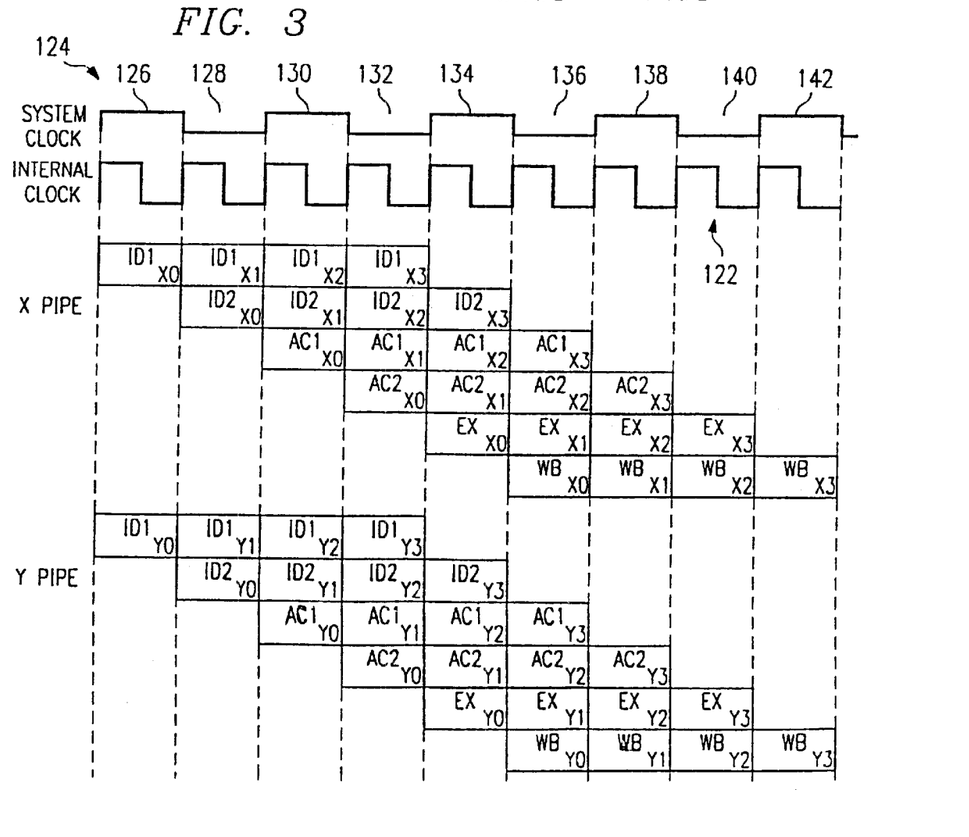
FIG. 3 illustrates a timing diagram showing the flow of instructions through the pipeline stages.

FIG. 3 illustrates the flow of four instructions per pipeline, showing the overlapping execution of the instructions, for a two pipeline architecture. Additional pipelines and additional stages for each pipeline could also be provided. In the preferred embodiment, the microprocessor 10 uses an internal clock 122 which is a multiple of the system clock 124. In FIG. 3, the internal clock is shown as operating at two times the frequency of the system clock. During the first internal clock cycle 126, the ID1 stage operates on respective instructions X0 and Y0. During internal clock cycle 128, instructions X0 and Y0 are in the ID2 stage (X0 being in ID2x and Y0 being in ID2y) and instructions X1 and Y1 are in the ID1 stage. During internal clock cycle 130, instructions X2 and Y2 are in the ID1 stage, instructions X1 and Y1 are in the ID2 stage (X1 being in ID2x and Y1 being in ID2y) and instructions X1 and Y1 are in the AC1 stage (X0 being in AC1x and Y0 being in AC1y). During internal clock cycle 132, instructions X3 and Y3 are in the ID1 stage, instructions X2 and Y2 are in the ID2 stage, instructions X1 and Y1 are in the AC1 stage and instructions X1 and Y1 are in the AC2 stage. The instructions continue to flow sequentially through the stages of the X and Y pipelines. As shown in clocks 134–140, the execution portion of each instruction is performed on sequential clock cycles. This is a major advantage of a pipelined architecture—the number of instructions completed per clock is increased, without reducing the execution time of an individual instruction. Consequently a greater instruction throughput is achieved with greater demands on the speed of the hardware.

The instruction flow shown in FIG. 3 is the optimum case. As shown, each pipe stage completes on time and no stage requires more than one clock cycle. In an actual machine, however, one or more stages may require additional clock cycles to complete thereby changing the flow of instructions through the other pipe stages. Furthermore, the flow of instructions through one pipeline may be dependent upon the flow of instructions through the other pipeline.

A number of factors may cause delays in various stages of one or all of the pipelines. For example, an access to memory may miss in the memory cache, thereby preventing access of the data in the time required to process the instruction in one clock. This would require that either, or both, sides of the AC1 stage to delay until the data was retrieved from main memory. For a particular stage, other stages of the pipeline may be using a needed resource, such as a multiplier, which is only in one of the execution stages in the illustrated embodiment In this case, the stage must delay until the resource is available. Data dependencies can also cause delays. If an instruction needs the result from a previous instruction, such as an ADD, it must wait until that instruction is processed by the execution unit.

Other delays are caused by "multi-box" instructions; i.e., instructions which are implemented using multiple microinstructions, and therefore require more than one clock cycle to complete. These instructions stop the flow of subsequent instructions through the pipeline at the output of the ID2 stage.

The flow of instructions through the pipeline is controlled by the pipe control unit 28. In the preferred embodiment, a single pipe control unit 28 is used to control the flow of instructions through both (or all) of the pipes. To control the flow of instructions through the pipes, the pipe control unit 28 receives "delay" signals from the various units comprising the pipelines 102 and 104, and issues "stall" signals to the various units.

Although a single pipe control unit 28 is used for both X and Y pipelines, the pipelines themselves are controlled independent of one another. In other words, a stall in the X pipeline does not necessarily cause a stall in the Y pipeline.

3. Execution Unit With Leading/Trailing Zero Detector

Figure 4:
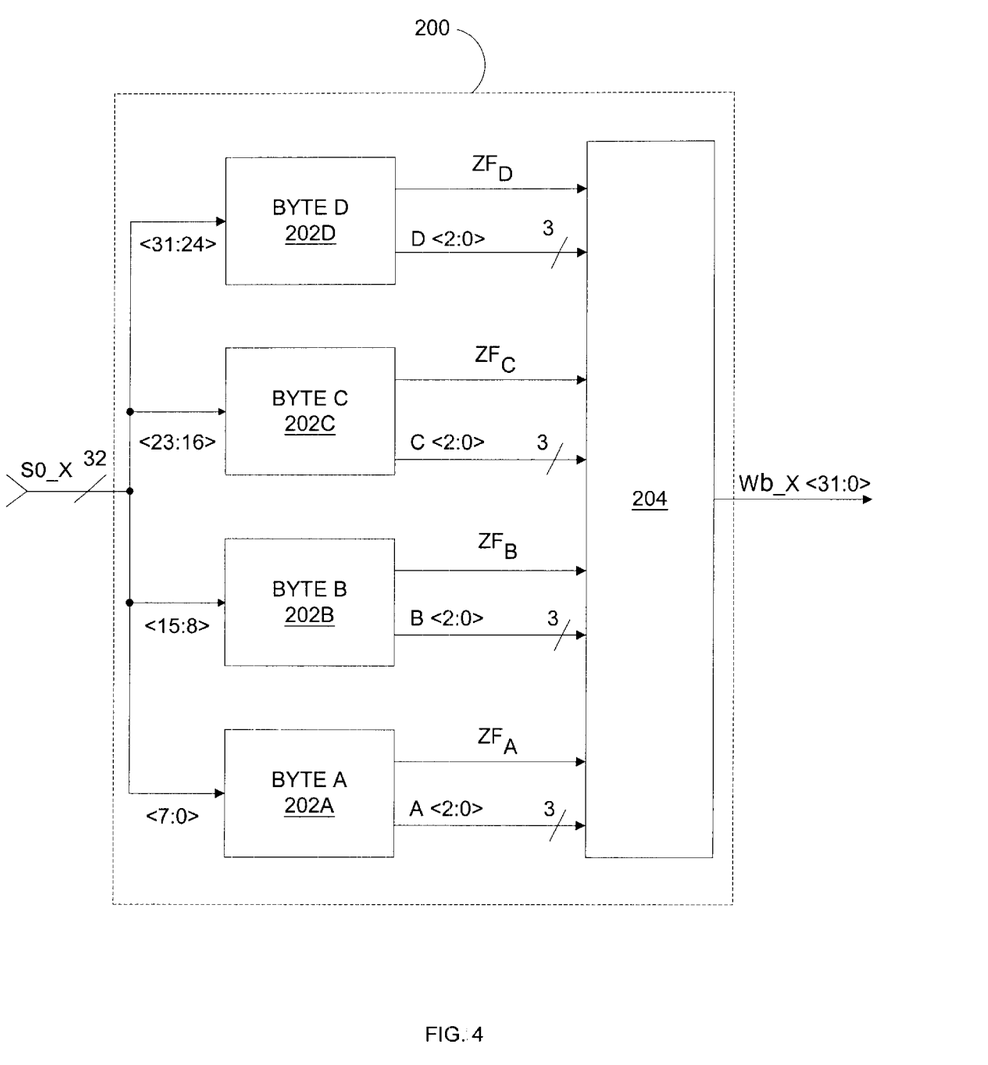
FIG. 4 illustrates the preferred embodiment for a leading/trailing zero detector disposed within the execution unit depicted in FIG. 1*a*.

Reference is now made to FIG. 4 which depicts the preferred embodiment for the leading/trailing zero detector 200 of the present invention. The leading/trailing zero detector 200 is disposed within the execution unit (EX_X) 23X for detecting and indexing the number of leading or trailing zeros in a source operand. The zero detector 200 has a 32-bit input bus coupled to the S0_X source output bus from register file 24 (FIG. 1a). The register file 24 provides a source operand on the S0_X source output bus in response to BSF or BSR instruction execution. The 32-bit source operand is parsed, for convenience, into four 8-bit bytes (D-A) and routed to four identical byte-wide detectors (202a–202d). Those skilled in the art will recognize, with the aid of the present disclosure, other lengths and sizes for detectors (202a–202d) without departing from the scope of the present invention. Each detector 202a–202d provides a single bit output $ZF_D$–$ZF_A$ to indicate that the data input byte contains all zeros and/or a three bit index output <2:0> to indicate the bit position of the first leading or trailing logical one within the data input byte.

Outputs $ZF_D$–$ZF_A$ and D-A <2:0> are coupled to decode logic 204 which decodes and concatenates the results of detectors 202a–202d into a six bit index to describe the leading/trailing bit location of the first logical one in the 32-bit source operand. The six bit index is padded with 26 leading zeros in the MSBs. The index is fed back on the writeback bus Wb_X (FIG. 1a) to the register file (physical registers) 24.

3.1 Byte-Wide Detector

Figure 5:
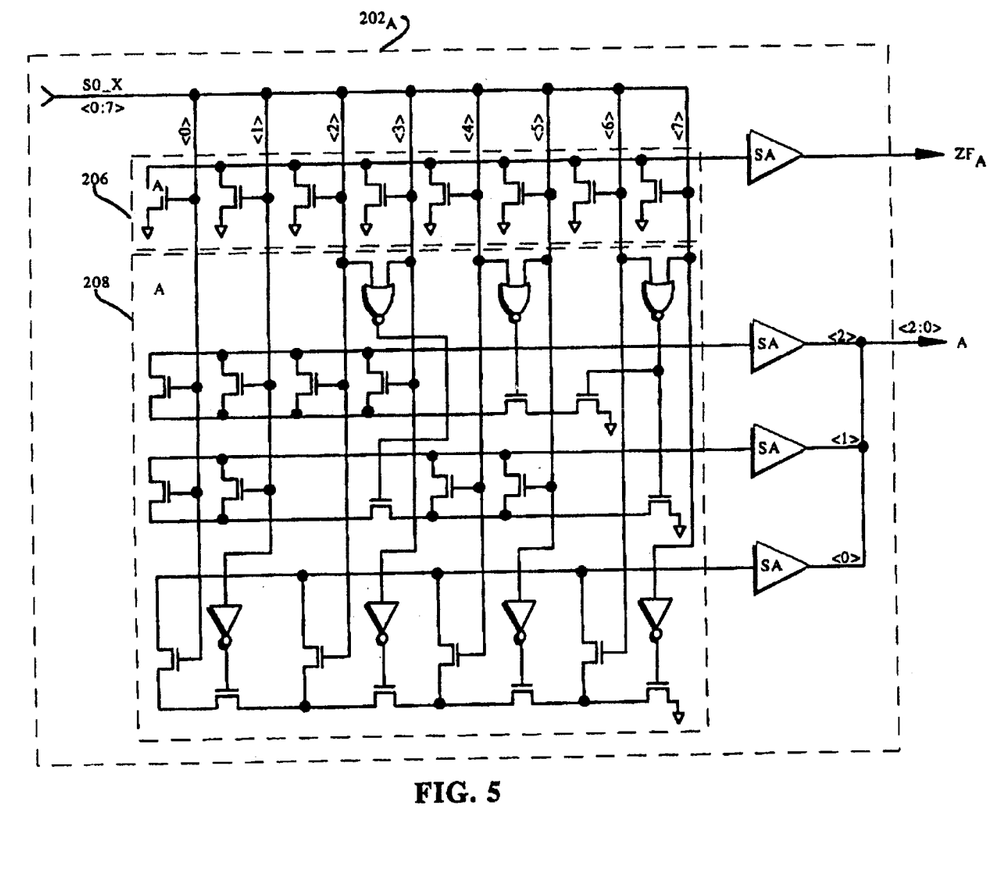
FIG. 5 illustrates the preferred embodiment for a byte-wide detector of the leading/trailing zero detector depicted in FIG. 4.

Reference is now made to FIG. 5 which depicts the preferred embodiment for the lowest order byte-wide detector $202_A$. It should be understood that the following discussion applies equally as well to detectors $202_B$–$202_D$. A plurality of N-channel MOS transistors $206_A$ have its drains commonly coupled to an "all zero" flag (ZF) input node on a sense amplifier, its gates individually coupled to input bits <7:0>, and its sources coupled to ground. If none of the input bits <7:0> are a logical one, all of the transistors 206 are turned off, thus none pull the ZF input node on the sense amplifier to ground indicating "all zeros". If even one of the input bits <7:0> is a logical one, the ZF input on the sense amplifier is pulled to ground signaling that the byte is non-zero.

The input bits <7:0> are also coupled to encode logic circuitry $208_A$. The exact details of encode logic circuitry $208_A$ are not necessary for the understanding of the present invention. Suffice it to say that the encode logic circuitry $208_A$ provides a three bit <2:0> output that uniquely identifies the first bit position (from the LSB position for a BSF instruction) which contains a logical one. The three bit <2:0> output is preferably buffered by sense amplifiers.

For the BSR instruction, swapping logic (not shown) swaps the bits from the source operand (Le. 31–0→0–31) with the highest order byte (D) being decoded through $202_A$ through the lowest order byte being decoded through $202_D$. Alternatively, a duplicate leading/trailing zero detector 200 can be employed which permanently has bits 31–0 reversed on detectors $202_A$–$202_D$.

3.2 Combinational Logic

Figure 6:
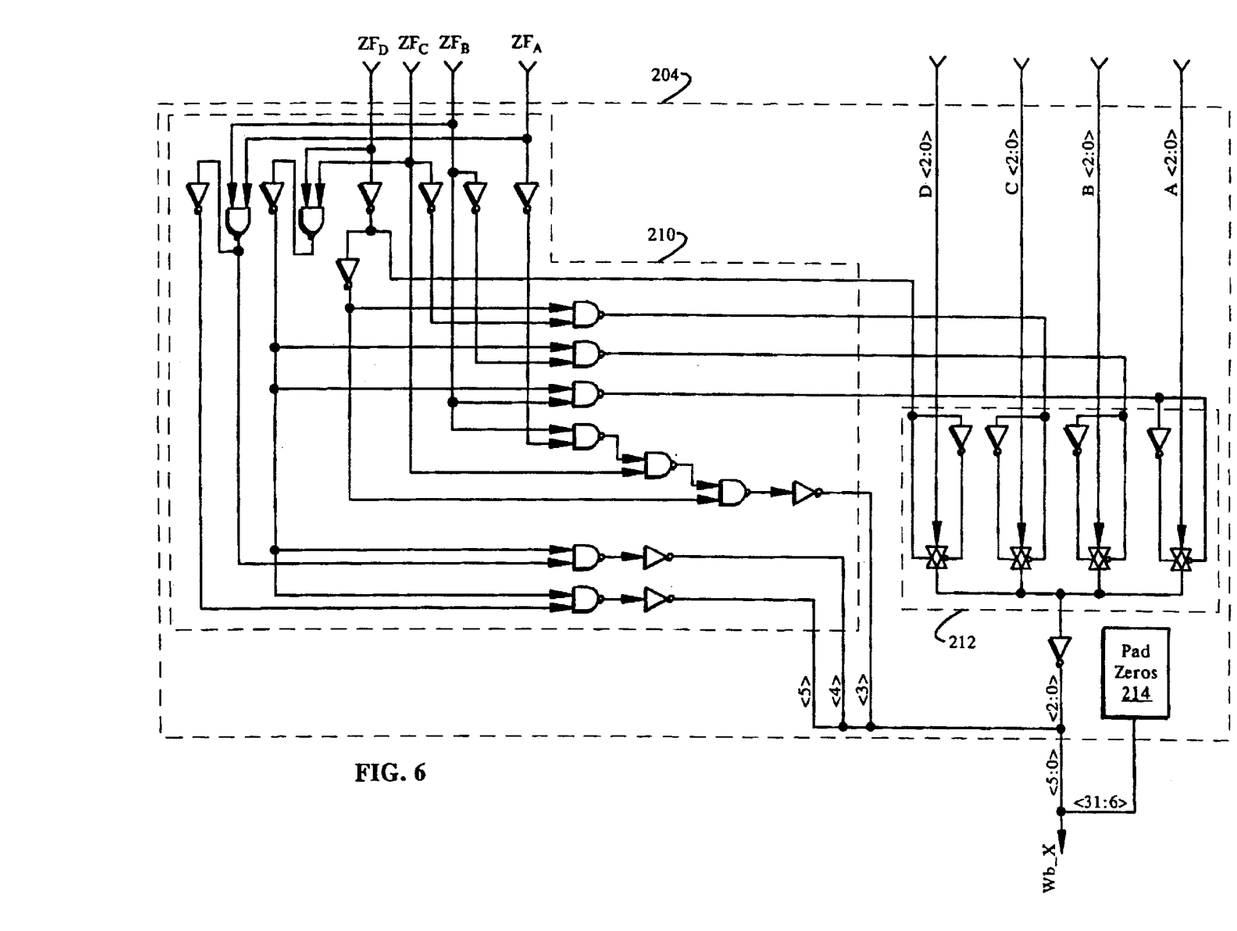
FIG. 6 illustrates the preferred embodiment for the combinational logic of the leading/trailing zero detector depicted in FIG. 4; and, FIG. 7 illustrates a flow diagram of the prior art BSF and BSR instructions.

Reference is now made to FIG. 6 which depicts the preferred embodiment for combinational logic $204_A$ of detector $200_A$ in the more detail. The $ZF_D$–$ZF_A$ outputs from detectors $202_D$–$202_A$ are coupled to decode logic 210 whose exact details are not necessary for the understanding of the present invention. Suffice it to say that decode logic 210 provides the three highest order significant bits MSB <5:3> onto the Wb__X bus for the index according to the logic truth table in Table 2. Index bits D <2:0>–A <2:0> from detectors $202_D$–$202_A$ are coupled to transmission gates 212. Transmission gates 212 are controlled by $ZF_D$–$ZF_A$ outputs via decode logic 210 according to the truth table in Table 2. Pad zeros circuitry 214 adds zeros to most significant bits <31:6> since only six bits are necessary to describe the thirty-two bit positions where the first logical one sides.

TABLE 2

| $ZF_D$ | $ZF_C$ | $ZF_B$ | $ZF_A$ | $MSB_8$ <5:3> | $LSB_8$ |
|---|---|---|---|---|---|
| X | X | X | 0 | 000 | A<2:0> |
| X | X | 0 | 1 | 001 | B<2:0> |
| X | 0 | 1 | 1 | 010 | C<2:0> |
| 0 | 1 | 1 | 1 | 011 | D<2:0> |
| 1 | 1 | 1 | 1 | 100 | D<2:0> |

4. Conclusion

Although the Detailed Description of the invention has been directed to certain exemplary embodiments, various modifications of these embodiments, as well as alternative embodiments, will be suggested to those skilled in the art. For example, specific register structures, mappings, bit assignments, and other implementation details are set forth solely for purposes of providing a detailed description of the invention. However, the invention has general applicability to any computer system architecture which executes bit scan instructions. Various modifications based on trade-offs between hardware and software logic will be apparent to those skilled in the art. Also, specific nomenclature is conventional for the x86 architecture and is used for the purpose of describing the exemplary embodiment only. The invention encompasses any modifications or alternative embodiments that fall within the scope of the Claims.

What is claimed is:

1. A computer processor comprising:
   a register file including a plurality of physical registers; and,
   an execution unit that executes bit scan instructions, coupled to the register file and having a leading/trailing zero detector circuit for receiving a source operand from the register file and detecting in parallel, which bit positions in the source operand are non-zero, and providing an output destination index having a plurality of bits, to indicate a first non-zero bit position in the source operand wherein the plurality of bits of the output destination index are simultaneously calculated and presented in parallel without requiring resolution of any of the plurality of bits before resolving any other of the plurality of bits.

2. A computer processor as recited in claim 1 wherein the first non-zero bit position is measured relative to a most significant bit in the source operand.

3. A computer processor as recited in claim 1 wherein the first non-zero bit position is measured relative to a least significant bit in the source operand.

4. A computer processor as recited in claim 1 wherein the leading/trailing zero detector circuit further comprises a single bit output to indicate that the source operand is all zeros.

5. A computer processor as recited in claim 4 wherein the leading/trailing zero detector circuit further comprises a plurality of N-channel MOS transistors each have a gate coupled to a bit on the source operand, a source coupled to ground, and commonly coupled drains to form the single bit output.

6. A computer processor as recited in claim 1 further comprising zero padding circuitry coupled to a destination register in the register file to pad leading zeros in most significant bits in the destination register wherein the output destination index is written to least significant bits in the destination register.

7. A computer processor comprising:
   (a) register means for sourcing a source operand and for receiving a destination index; and,
   (b) execution means for executing bit scan instructions and having leading/trailing zero detector means for receiving the source operand from the register means, detecting in parallel, which bit positions in the source operand are non-zero, and providing the destination index having a plurality of bits, to indicate a first non-zero bit position in the source operand wherein the plurality of bits of the destination index are simultaneously calculated and presented in parallel without requiring resolution of any of the plurality of bits before resolving any other of the plurality of bits.

8. A computer processor as recited in claim 7 wherein the first non-zero bit position is measured relative to a most significant bit in the source operand.

9. A computer processor as recited in claim 7 wherein the first non-zero bit position is measured relative to a least significant bit in the source operand.

10. A computer processor as recited in claim 7 wherein the leading/trailing zero detector means further comprises a single bit output to indicate that the source operand is all zeros.

11. A computer processor as recited in claim 7 further comprising zero padding means coupled to a destination register in the register means for padding leading zeros in most significant bits in the destination register wherein the destination index is written to least significant bits in the destination register.

12. A method of expediting bit scan instructions comprising the steps of:
   (a) sourcing a source operand for a bit scan instruction;
   (b) executing the bit scan instruction by detecting in parallel, leading/trailing zeros in the source operand; and
   (c) writing a destination index having a plurality of bits indicating a first non-zero bit position in the source operand wherein the plurality of bits of the destination index are simultaneously calculated and presented in parallel without requiring resolution of any of the plurality of bits before resolving any other of the plurality of bits.

13. A method as recited in claim 12 wherein the first non-zero bit position is measured relative to a most significant bit in the source operand.

14. A method as recited in claim 12 wherein the first non-zero bit position is measured relative to a least significant bit in the source operand.

15. A method as recited in claim 12 wherein step (b) further comprises the step of indicating if the source operand is all zeros.

16. A method as recited in claim 12 wherein step (c) further comprises padding leading zeros in most significant bits in the destination index.

17. A computer system comprising:
   (a) a motherboard;
   (b) memory, disposed on the motherboard, storing at least one bit scan instruction; and,
   (c) a processor disposed on the motherboard coupled to the memory and including,
      (i) a register file including a plurality of physical registers; and,
      (ii) an execution unit that executes the at least one bit scan instruction, coupled to the register file and having a leading/trailing zero detector circuit for receiving a source operand from the register file and detecting in parallel, which bit positions in the source operand are non-zero, and providing an output destination index having a plurality of bits, to indicate a first non-zero bit position in the source operand wherein the plurality of bits of the output destination index are simultaneously calculated and presented in parallel without requiring resolution of any of the plurality of bits before resolving any other of the plurality of bits.

18. In a computer having a motherboard, a processor, and system memory external to the processor, a method of executing bit scan instructions comprising steps of:
   (a) retrieving the bit scan instructions from system memory;
   (b) executing the bit scan instructions with the processor including;
      (i) sourcing a source operand;
      (ii) detecting in parallel, leading/trailing zeros in the source operand; and,
      (iii) writing a destination index having a plurality of bits indicating a first non-zero bit position in the source operand wherein the plurality of bits of the destination index are simultaneously calculated and presented in parallel without requiring resolution of any of the plurality of bits before resolving any other of the plurality of bits.

* * * * *